US010059384B2

(12) United States Patent
Telnack

(10) Patent No.: US 10,059,384 B2
(45) Date of Patent: *Aug. 28, 2018

(54) SELF-DEPLOYING APPARATUSES, ASSEMBLIES, AND METHODS FOR DRAG REDUCTION OF LAND VEHICLES

(71) Applicant: Aerovolution Corporation, Olympia, WA (US)

(72) Inventor: Lee Joseph Telnack, Olympia, WA (US)

(73) Assignee: Aerovolution Corporation, Olympia, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,214

(22) Filed: May 10, 2016

(65) Prior Publication Data

US 2016/0325792 A1 Nov. 10, 2016

Related U.S. Application Data

(63) Continuation of application No. 14/863,317, filed on Sep. 23, 2015, now Pat. No. 9,333,993, which is a
(Continued)

(51) Int. Cl.
*B62D 35/00* (2006.01)

(52) U.S. Cl.
CPC ......... *B62D 35/001* (2013.01); *B62D 35/007* (2013.01)

(58) Field of Classification Search
CPC .... B62D 35/00; B62D 35/001; B62D 35/002; B62D 35/007
(Continued)

(56) References Cited

U.S. PATENT DOCUMENTS

| 2,737,411 A | 3/1956 | Potter |
| 3,424,222 A | 1/1969 | Caulkins |

(Continued)

FOREIGN PATENT DOCUMENTS

| CA | 2405754 C | 10/2005 |
| WO | 2009102695 A2 | 8/2009 |
| WO | 2014210360 A1 | 12/2014 |

OTHER PUBLICATIONS

International Search Report and Written Opinion for PCT/US2014/044412 dated Oct. 14, 2014.
(Continued)

*Primary Examiner* — Gregory A Blankenship
(74) *Attorney, Agent, or Firm* — Dorsey & Whitney LLP

(57) ABSTRACT

Examples of drag reduction apparatuses and assemblies for land vehicles, and particularly for attachment to a door of a land vehicle operated by a cam lock bar, are described. A drag reduction apparatus may include a plurality of panels foldedly coupled together and automatically deployable into an unfolded configuration. The panels may be coupled to a base panel that is coupled to the door of the land vehicle by a double-hinge mechanism operated by the cam lock bar. The double-hinge mechanism may draw the base panel toward the centerline of the rear of the land vehicle to allow the door to fully open with the drag reduction apparatus attached. The apparatus may be attached to two adjacent doors of a land vehicle and a plurality of panels on one door configured to overlap with a plurality of panels on the adjacent door.

47 Claims, 6 Drawing Sheets

Related U.S. Application Data continuation of application No. PCT/US2014/044412, filed on Jun. 26, 2014.

(60) Provisional application No. 61/840,393, filed on Jun. 27, 2013.

(58) Field of Classification Search
USPC .............................. 296/180.1, 180.4, 180.5
See application file for complete search history.

(56) References Cited

U.S. PATENT DOCUMENTS

| | | | |
|---|---|---|---|
| 3,814,472 | A | 6/1974 | Zelikovitz |
| 4,006,932 | A | 2/1977 | McDonald |
| 4,036,519 | A | 7/1977 | Servais et al. |
| 4,142,755 | A | 3/1979 | Keedy |
| 4,236,745 | A | 12/1980 | Davis |
| 4,257,641 | A | 3/1981 | Keedy |
| 4,401,338 | A | 8/1983 | Caldwell |
| 4,458,936 | A | 7/1984 | Mulholland |
| 4,508,380 | A | 4/1985 | Sankrithi |
| 4,553,781 | A | 11/1985 | Johnson |
| 4,601,508 | A | 7/1986 | Kerian |
| 4,702,509 | A | 10/1987 | Elliott, Sr. |
| 4,741,569 | A | 5/1988 | Sutphen |
| 4,978,162 | A | 12/1990 | Labbe |
| 5,058,945 | A | 10/1991 | Elliott, Sr. et al. |
| 5,094,497 | A | 3/1992 | Hartung et al. |
| 5,163,494 | A | 11/1992 | MacNeil et al. |
| 5,236,347 | A | 8/1993 | Andrus |
| 5,332,280 | A | 7/1994 | Dupont et al. |
| 5,498,059 | A | 3/1996 | Switlik |
| 5,782,521 | A | 7/1998 | Anderson |
| 5,823,610 | A | 10/1998 | Ryan et al. |
| 5,947,548 | A | 9/1999 | Carper et al. |
| 6,017,082 | A | 1/2000 | Leoni |
| 6,092,861 | A | 7/2000 | Whelan |
| 6,119,307 | A | 9/2000 | Weishar et al. |
| 6,257,654 | B1 | 7/2001 | Boivin et al. |
| 6,309,010 | B1 | 10/2001 | Whitten |
| 6,409,252 | B1 | 6/2002 | Andrus |
| 6,457,766 | B1 | 10/2002 | Telnack |
| 6,467,833 | B1 | 10/2002 | Travers |
| 6,485,087 | B1 | 11/2002 | Roberge et al. |
| 6,666,498 | B1 | 12/2003 | Whitten |
| 6,799,791 | B2 | 10/2004 | Reiman et al. |
| 7,008,004 | B2 | 3/2006 | Ortega et al. |
| 7,618,086 | B2 | 11/2009 | Breidenbach |
| 7,837,254 | B2 | 11/2010 | Reiman et al. |
| 7,854,468 | B2 | 12/2010 | Vogel et al. |
| 8,025,329 | B1 | 9/2011 | Kron |
| 8,079,634 | B2 | 12/2011 | Visser et al. |
| 8,100,461 | B2 | 1/2012 | Smith et al. |
| 8,177,287 | B2 | 5/2012 | Vogel et al. |
| 8,287,030 | B2 | 10/2012 | Ryan et al. |
| 8,360,509 | B2 | 1/2013 | Smith et al. |
| 8,414,064 | B2 | 4/2013 | Litchfield |
| 8,444,210 | B2 | 5/2013 | Domo et al. |
| 8,579,360 | B2 | 11/2013 | Litchfield |
| 8,672,391 | B1 | 3/2014 | Cobb |
| 8,851,554 | B2 | 10/2014 | Wayburn et al. |
| 8,893,764 | B2 | 11/2014 | Mascari et al. |
| 9,051,013 | B1 | 6/2015 | Popa |
| 9,333,993 | B2 * | 5/2016 | Telnack ............... B62D 35/001 |
| 2002/0030384 | A1 | 3/2002 | Basford |
| 2004/0119319 | A1 | 6/2004 | Reiman et al. |
| 2006/0273625 | A1 | 12/2006 | Andrus et al. |
| 2007/0001481 | A1 | 1/2007 | Breidenbach |
| 2007/0126261 | A1 | 6/2007 | Breidenbach |
| 2008/0048468 | A1 | 2/2008 | Holubar |
| 2008/0061598 | A1 * | 3/2008 | Reiman ............... B62D 35/001 |
| | | | 296/180.4 |
| 2008/0116716 | A1 | 5/2008 | O'Grady |
| 2008/0164722 | A1 | 7/2008 | Breidenbach |
| 2008/0309122 | A1 | 12/2008 | Smith et al. |
| 2009/0096250 | A1 | 4/2009 | Kohls |
| 2009/0179456 | A1 | 7/2009 | Holubar |
| 2009/0200834 | A1 * | 8/2009 | Vogel ............... B62D 35/001 |
| | | | 296/180.3 |
| 2010/0225143 | A1 | 9/2010 | Skopic |
| 2011/0037291 | A1 | 2/2011 | Pickering |
| 2011/0068603 | A1 | 3/2011 | Domo et al. |
| 2011/0084516 | A1 | 4/2011 | Smith et al. |
| 2011/0221231 | A1 * | 9/2011 | Visser ............... B62D 35/001 |
| | | | 296/180.4 |
| 2013/0106136 | A1 | 5/2013 | Smith et al. |
| 2014/0117713 | A1 | 5/2014 | Baker |
| 2014/0367993 | A1 | 12/2014 | Breidenbach |
| 2015/0035312 | A1 | 2/2015 | Grandominico et al. |
| 2015/0274220 | A1 | 10/2015 | Telnack |
| 2015/0329152 | A1 | 11/2015 | Baker et al. |
| 2016/0009322 | A1 | 1/2016 | Telnack |
| 2016/0096559 | A1 * | 4/2016 | Traylor ............... B62D 35/001 |
| | | | 296/180.4 |

OTHER PUBLICATIONS

"Motion to Introduce Proceedings and Exhibits", Superior Court, Province of Quebec, District of Montreal; Art. 1458, 1590 and ff. CCQ; Sep. 22, 2015., 1-63.

Examiner's Report for Canadian Patent Appl. No. 2916928 dated Oct. 18, 2016.

Extended European Search Report received for EP Appl. No, 14818061.5 dated Jan. 31, 2017.

* cited by examiner

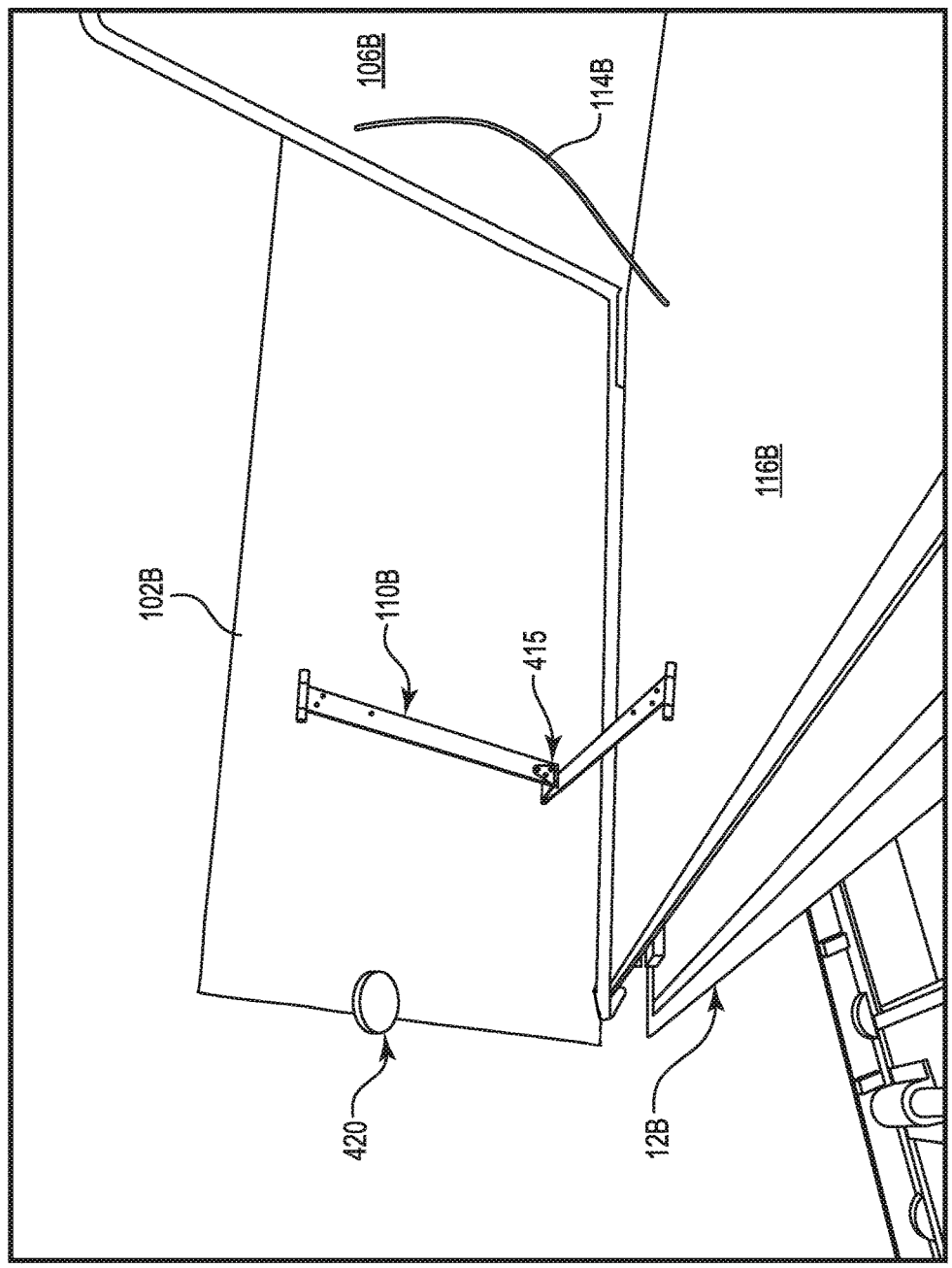

SELF-DEPLOYING APPARATUSES, ASSEMBLIES, AND METHODS FOR DRAG REDUCTION OF LAND VEHICLES

CROSS-REFERENCE TO RELATED APPLICATION(S)

This application is a continuation of U.S. application Ser. No. 14/863,317 filed Sep. 23, 2015, issued as U.S. Pat. No. 9,333,993 on May 10, 2016, which is a continuation of PCT Application No. PCT/US2014/044412, filed Jun. 26, 2014, which application claims the benefit of U.S. Provisional Patent Application No. 61/840,393, filed Jun. 27, 2013, the applications and patents of which are incorporated herein by reference in their entirety for any purpose.

TECHNICAL FIELD

This present disclosure relates to methods and devices for drag reduction of land vehicles, such as trucks, tractor trailers and similar vehicles.

BACKGROUND

The present disclosure relates to drag reduction for land vehicles, such as trucks, tractor-trailer rigs, buses, recreational vehicles and the like. Drag generated by a vehicle may be proportional to the surface area of the vehicle, and such larger land vehicles may be particularly concerned with reducing drag in order to reduce fuel consumption. While certain drag reduction devices for land vehicles are known, devices of this kind may have limitations and may not be suited for all applications. For example, known drag reduction devices are typically designed to attach to the frame of a truck cargo door. As such, the drag reduction device must be pulled to the side of the truck body and/or swung open in order to access the cargo door. This may be cumbersome as it may add extra steps before an operator can reach the cargo. This may be particularly disadvantageous for freight or other shipping operators who may be operating under tight schedules. Alternate and/or improved devices for drag reduction may be desirable.

SUMMARY OF THE INVENTION

Examples of apparatuses, systems and methods for drag reduction of land vehicles, such as trucks, tractor trailers and similar vehicles, are described, including examples of drag reduction apparatus for attachment to a roll-up door of a land vehicle. An apparatus according to examples of the disclosure may include a plurality of panels including a pair of top panels, a pair of bottom panels, first and second side panels, and a plurality of transition panels connecting the top, bottom, and side panels, the plurality of panels may be foldably coupled to allow the panels to be provided between a folded configuration in which the panels may be flat against each other and a deployed configuration in which the panels may define a cavity therebetween, wherein the pair of top panels may be configured to transition between the folded configuration and the deployed configuration simultaneously and the pair of bottom panels may be configured to transition between the folded configuration and the deployed configuration simultaneously, and an attachment mechanism disposed along an edge of the top, bottom, and side panels which may be configured to foldably couple the edges of the panels to a surface of a land vehicle. The apparatus may further include a pair of base panels, wherein the pair of top panels and the first and second side panels may be hingedly coupled to the pair of base panels around a perimeter of the cavity, and the bottom panels may be hingedly coupled to the pair of base panels midway along a length of the base panels, wherein the panels are flat against each other against a front surface of the base panels in the folded configuration. The base panels may include attachment mechanisms disposed on back surfaces of the base panels opposite the front surfaces of the base panels, the attachment mechanisms may be configured to hingedly attach the base panels to the surface. The attachment mechanisms may be configured to draw the base panels toward a centerline of the surface when activated. The attachment mechanisms may be activated by rotating a bar that may be coupled to the attachment mechanisms.

An apparatus for reducing drag according to examples of the disclosure may include a first and a second top panel, a first and a second bottom panel, a first and a second side panel, a first plurality of transition panels that may connect the first top, bottom, and side panels, the first plurality of panels may be foldably coupled, a second plurality of transition panels may connect the second top, bottom, and side panels, the second plurality of panels may be foldably coupled, wherein the first and second plurality of panels may allow the panels to be provided between a folded configuration in which the panels may be flat against each other and a deployed configuration in which the panels may define a cavity therebetween, a first attachment mechanism disposed along an edge of the first top, bottom, and side panels which may be configured to foldably couple the edges of the panels to a first base panel, and a second attachment mechanism disposed along an edge of the second top, bottom, and side panels which may be configured to foldably couple the edges of the panels to a second base panel, wherein the second base panel may be adjacent to the first base panel, wherein the first and second base panels may be configured to be attached to a rear surface of a land vehicle.

A system for drag reduction according to examples of the disclosure may include a first door and a second door of a land vehicle, the first and second doors may each include an edge hingedly coupled to a doorway of the land vehicle, wherein the first and second doors may be adjacent, the first and second doors may each include a cam lock bar, and an apparatus that may comprise a plurality of panels, the apparatus may be coupled to the first and second doors, wherein the apparatus may be coupled in a manner configured to allow the first and second doors to open and close while the apparatus is attached.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 4 shows a partial view of an apparatus according to the present disclosure as perceived from the bottom looking upward and illustrating an over-center brace member for a top panel of the apparatus.

DETAILED DESCRIPTION

Figure 1:
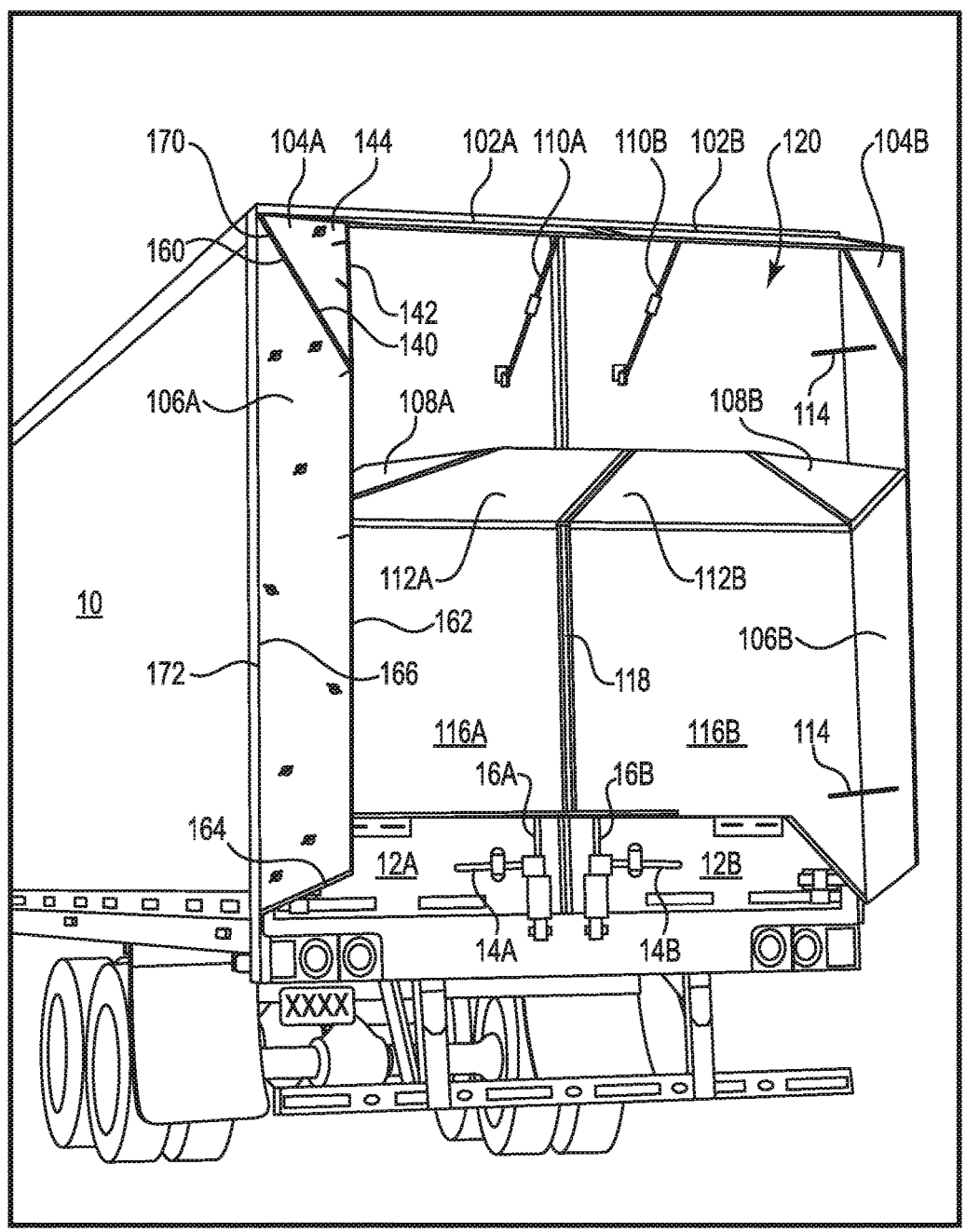
FIG. 1 shows an exemplary apparatus according to the present disclosure, the apparatus shown attached to a door of a truck and in a deployed configuration.

In the following detailed description, reference is made to the accompanying drawings, which form a part hereof. In the drawings, similar symbols typically identify similar components, unless context dictates otherwise. The illustrative examples described in the detailed description and drawings are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated.

The present disclosure relates to apparatuses and method for drag reduction of land vehicles. Land vehicles include, but are not limited to, trucks and tractor trailers. Drag reduction apparatuses according to the present disclosure may be configured to be self-deploying. The apparatus may be configured to expand to its unfolded (e.g. deployed state, for example, as shown in FIG. 1) due to a low pressure region developing around and/or at the rear end of the vehicle, which may occur as the vehicle increases its speed. Suction or lift force may be generated and applied to the panels of the apparatus as a result of a lower pressure around and/or in the wake of the vehicle as compared to immediately behind the vehicle. Sufficient lift force to deploy the apparatus may occur when the vehicle reaches a threshold velocity. In some embodiments, the threshold velocity may be between 35-45 miles per hour. The apparatus may be configured to have a higher or lower threshold velocity for deployment. Examples of drag reducing devices described herein may be referred to as a "ventilated cavity" type device, owing to the mechanism of deployment being lift force generated by a lower pressure region. However, the theory behind the mechanism of deployment is provided here by way of explanation, and is not intended to be limiting.

Apparatuses according to the present disclosure may include a plurality of rigid or semi-rigid panels which may be foldedly or hingedly coupled together, e.g., for allowing the panels to be automatically moved between a first (e.g., folded or undeployed) configuration and a second (e.g., unfolded or deployed) configuration on attaining a threshold speed of the vehicle to which the apparatus is attached.

FIG. 1 illustrates an example apparatus 100 in the deployed configuration according to an embodiment of the disclosure. The apparatus 100 is illustrated installed on a truck trailer 10 with two adjacent hingedly attached doors 12A-B. Each door 12A-B includes a cam lock 14A-B coupled to a cam bar 16A-B for opening, closing, and securing the doors 12A-B. The apparatus 100 may be attached to doors having different configurations than the configuration illustrated in FIG. 1. The apparatus for drag reduction 100 may include a plurality of panels, including a pair of top panels 102A-B, a pair of bottom panels 112A-B, and first and second side panels 106A-B. The first and second side panels may also be referred to as driver-side 106A and curb-side 106B panels, although it is to be understood that the designation of "driver-side" and "curb-side" may change depending on the configuration of the vehicle and requirements for positioning the driver side to meet local laws or regulations. The apparatus may also include a plurality of transition panels 104A-B, 108A-B connecting the top, bottom and side panels. The combined top 102A-B, combined bottom 112A-B and each of the side 106A-B panels may be generally rectangular or slightly trapezoidal in shape. The transition panels 104A-B, 108A-B may be generally triangular and may be disposed such that they bridge the gaps between the top, bottom, and/or side panels. Other geometries may be possible without departing from the principles of the invention.

The plurality of panels may be folded according to any number of folding configurations. In an example embodiment of the disclosure illustrated in FIG. 2, the top panels 102A-B may fold on top of the side panels 106A-B and be the outermost panels when the apparatus 100 is in the folded configuration. In other embodiments, the side panels 106A-B may be the top most or outer most panels in the folded configuration, with the top 102A-B and/or bottom panels 112A-B disposed between the side panels 106A-B and the door 12A-B. In the deployed configuration, the apparatus 100 may define a cavity 120 between at the panels. For example, as shown in FIG. 1, a generally rectangular or slightly tapered rectangular cavity 120 may be defined between the top 102A-B, bottom 112A-B, and at least portions of the side 106A-B panels, which may provide aerodynamic advantages as may be appreciated by those skilled in the art. Depending on the folding configurations, the top 102A-B, bottom 112A-B, and/or side 106A-B panels may combine with adjacent transition panels 104A-B, 108A-B to form generally rectangular or slightly trapezoidal panel sections along vertical and horizontal axis when unfolded to define the cavity 120 therebetween. The panels may be shaped and/or sized so as to achieve a desired shape at the tail end of the vehicle, which may be selected for optimal or improved drag reduction.

The panels may be made of a lightweight material, such as a polymer or composite. In some examples, one or more of the panels may be made from sheet metal, fiber board, or other semi-rigid or rigid structures or materials. The panels may be configured such that they maintain their shape without any substantial flex or sag while in the deployed configuration. In some examples, the panels may be formed using a fiber reinforced polypropylene or polyethylene (FRP) material and may have a thickness of about 0.05 to about 0.24 inches. The panels may generally have any thickness which can be accommodated between the cargo door and the side of the vehicle when the door is secured/stowed in an open position (see e.g., FIG. 3). In some examples, the panels may be made of foam which may be laminated on one or both sides. The foam may be polyethylene foam, and in examples, it may be laminated (e.g. faced) using one or more layers for improved durability of the panels and/or for preventing damage to the core, such as by preventing intrusion of pollutants into the foam core. While not meant to be limiting, in some examples, the outer layers may be made of substantially any polymeric material, for example nylon, polyester, mylar, or any other of a variety of durable polymeric materials. In some examples, the outer layers may be provided as a film or a woven layer of polymer or aramid fibers. Other materials may be used for the outer layers and/or core. In some examples, the panels may be mylar or nylon faced foam insulation panels may be up to about 0.25 inch thick, or in some examples, may have a thickness of up to about 0.5 inches. Other thicknesses may be used. The panels, and depending on the materials selected, may have a different thickness, and the examples described herein are provided for illustration purposes and are not to be taken in a limiting sense. Generally, any foam or other semi-rigid material may be used to provide a desired level of rigidity while being sufficiently lightweight for self-deployment. Generally, the panels may be made from any material that is sufficiently stiff or rigid to maintain their shape in the deployed state.

Referring back to FIG. 1, in some examples, the apparatus may include a pair of base panels 116A-B (also referred to as back cover panels), which may lie generally parallel to the door 12A-B of the truck. The base panels 116A-B may be in direct contact with the door 12A-B, or in some examples, the base panels 116A-B may be spaced apart from the surface of the door, as will be further described, e.g., to provide clearance for operation of the cam lock bar of the truck door. Moreover, the base panels 116A-B may be hingedly attached to the door, for example, using a double-hinge mechanism (not shown in FIG. 1) as will be described with reference to FIGS. 5-6. The double-hinge mechanism may facilitate lateral movement of the base panels 116A-B during opening and closing of the door 12A-B, e.g. to avoid trapping or pinching the base panels 116A-B at the door hinge bite. As will be understood, the truck door 12A-B may swing approximately 270 degrees. Because the base panels 116A-B may extend all the way to the edge of the door (e.g., to the door hinges), it may be desirable for the base panels 116A-B to be movable towards centerline (e.g., edges of the doors opposite the door hinges) when the door 12A-B rotates to the about 270 degree position. Moving the base panels 116A-B towards centerline may prevent the apparatus 100 from becoming pinched at the door hinge bite. The double-hinge mechanism may be biased so that it automatically returns to the neutral position with the driver-side/curb-side edges of the apparatus 100 generally aligned with the driver-side/curb-side edges of the door 12A-B when the door 12A-B is pivoted back to about 90 degrees. Attachment of the apparatus 100 to the door 12A-B using double-hinge mechanisms of the kind described herein may facilitate in some examples shifting of the whole apparatus 100 (e.g., each half of the apparatus 100) towards centerline to allow full compaction of the apparatus 100 against the side of the trailer 10 and forward out of the door hinge bite. Accordingly, examples of drag reduction apparatuses described herein may allow for easier opening and closing of the doors of the land vehicles to which the apparatuses are attached.

The peripheral panels (e.g., the top 102A-B, bottom 112A-B, and side panels 106A-B) may be pivotally or hingedly attached to the base panels 116A-B along a perimeter of the cavity 120 that forms when the panels are deployed. In some examples, the bottom panels 112A-B may be attached along a bottom edge of the apparatus 100. In other examples, e.g., as shown in FIG. 1, the bottom panels 112A-B may be attached at an intermediate location along the vertical axis. For example, the bottom panels 112A-B may be located midway or slightly below the midpoint between the top panels 102A-B and the bottom of the doors 12A-B. The apparatus may include any number of retention mechanisms 114, which may be configured to limit the movement of some of the panels, e.g., the amount of rotation of any of the peripheral panels relative to the base panels 116A-B. For example, one or more strings, cords, bungees, or other suitable tension members may be attached between the base panels 116A-B and any one of the top 102A-B, bottom 112A-B, and/or side panels 106A-B. One or more retention mechanisms 114 according to the examples herein may be attached to any of the peripheral panels. Optionally, retention mechanisms 114 may be coupled to the bottom panels 112A-B so as to prevent the bottom panel 112A-B from folding upward when deployed, e.g., due to low pressure. One or more retention mechanisms 114 may be included for the side 106A-B and/or top panels 112A-B. The retention mechanism 114 (e.g., cord) may be collapsible to allow a peripheral panel to fold towards the base panels 116A-B. The retention mechanism 114 may have a fixed length when expanded to prevent the peripheral panel from rotating beyond a predetermined position (e.g., up to 90 degrees) relative to the base panels 116A-B.

In some examples, an over-center brace member 110A-B, which may be made of metal or a rigid plastic material, may be used. As shown in FIG. 1, a pair of over-center braces 110A-B may each be attached to an outer surface of one of the base panels 116A-B and to a bottom surface of each of the top panels 102A-B facing the respective base panel 116A-B. The over-center brace member 110A-B may be self-deployable in that it may be configured to expand due to the lifting force on the panel. An example of an over-center brace member 110 according to an embodiment of the disclosure is shown in more detail in FIG. 4. The brace may include an over-center mechanism 415 which urges the over-center brace member 110 into an expanded position once deployed, which may be advantageous in preventing premature collapse of the top panel 102A-B. One or more over-center braces 110A-B may be included between any of the peripheral panels and the base panels 116A-B. In some embodiments, the over-center brace 110A-B may be configured for providing any of the peripheral panels in up to about 45 degree position relative to the base panels 116A-B, which may restrict hyper-extension of the panels and may be an aerodynamically desirable position.

Foldable joints, which may also be referred to as hinge joints or living hinges, may be disposed between each panel to allow the panels to pivot relative to one another. The foldable joints may be implemented according to any suitable technique. For example, the foldable joint may include one or more layers of flexible material which is secured (e.g., fused, heat welded, mechanically fastened, etc.) along respective edge portions of adjoining or adjacent panels. The foldable joint may be configured to reduce or minimize resistance to pivotal motion of the panels. In some instances, the foldable joint may be biased so as to urge or facilitate pivotal motion in one direction and/or resist rotation in an opposite direction. The foldable joint may be a multi-layer structure (e.g., a two-ply structure) made from elastomeric or other durable flexible materials. In some examples, living hinges may be implemented using mechanically fixed dual durometer extrusions. A gap may remain between the layers of the foldable joint for flex and minimal resistance to the pivoting/folding action.

The foldable joints may be located between the transition panels 104A-B, 108A-B and the side panels 106A-B, the top panels 102A-B, and the bottom panels 112A-B. The foldable joints may also be between side panels 106A-B and the base panels 116A-B, the top panels 102A-B and the base panels 116A-B, and the bottom panels 112A-B and the base panels 116A-B. The foldable joints may be located at edges of two or more panels. For example, driver-side side panel 106A may have edges 160, 162, 164, and 166. Adjacent transition panel 104A may have edges 140, 142, and 144. A foldable joint 170 may be located at the interface of edge 160 of side panel 106A and edge 140 of transition panel 104A. A joint similar to foldable joint 170 may be located along an edge transition panel 104A and an edge of top panel 102A. A similar foldable joint similar to the foldable joint 170 may be located along an edge of transition panel 108A and an edge of bottom panel 112A. Transition panel 108A may have a second foldable joint along a second edge adjacent to a back surface of side panel 106A. However, other attachment mechanisms between transition panel 108A and the back surface of side panel 106A may be used. Similar foldable joints may also be located along corresponding panels on the curb-side panels (B).

Side panel 106A may have a foldable joint 172 along edge 166 to couple the side panel 106A to an outer edge the base panel 116A. Side panel 106A may also be hingedly coupled to the outer edge of the base panel 116A. In an alternative embodiment, the side panel 106A may be directly coupled to an edge of the door 12A along edge 166. Similarly, top panel 102A may have a foldable joint along a top edge of the top panel and a top edge of the base panel 116A to couple the top panel 102A to the base panel 116A. Top panel 102A may also be hingedly coupled to the top edge of the base panel 116A. In an alternative embodiment, the top panel 102A may be directly coupled to a top edge of the door 12A. Similar foldable joints or other attachment mechanisms may also be located along corresponding panels on the curb-side panels (B).

Figure 3:
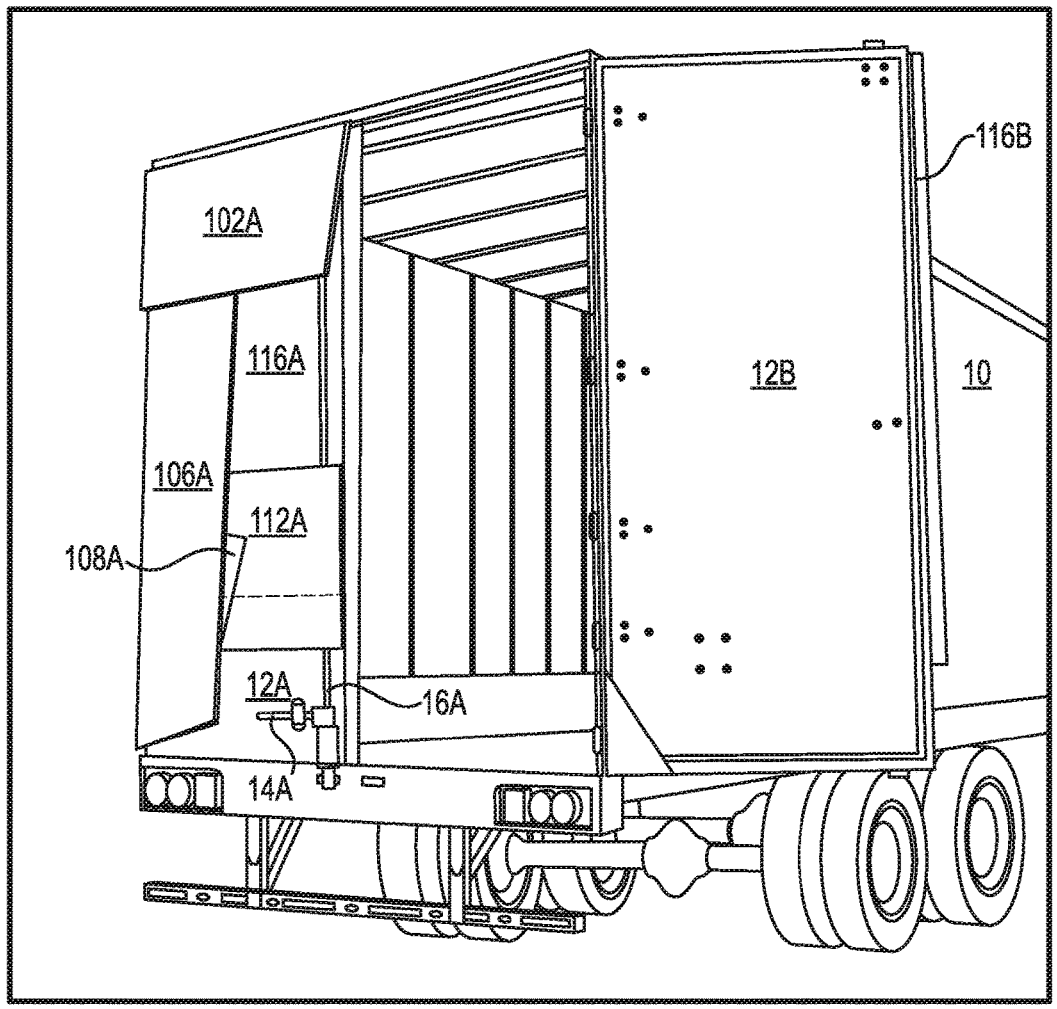
FIG. 3 shows a further example according to the present disclosure, including close-up or partial view of an apparatus attached to a truck door and the truck door being operated into an open or partially open position.

As shown in FIG. 3, the apparatus 100 may remain attached to the trailer 10 door 12B, when opening and/or closing the door 12B, including while moving the handle 14B of the cam lock bar 16B and/or stowing the door 12B in a secured open position. In some examples, the apparatus 100 may span most or substantially all of the surface area of the cargo door 12. The apparatus 100 may be generally rectangular in plan and may be shaped/sized such that it covers most or all of the surface area of the rear end of the truck trailer 10. The apparatus 100 may be provided in some examples with a cutout or indented portion along a bottom portion of the apparatus 100 such that the apparatus, when attached at the back of the truck trailer 10, remains clear of the handle 14 of the cam lock bar 16.

In some examples, the drag reduction apparatus 100 may be affixed to the back end of a land vehicle (e.g., a truck) in a manner which does not interfere with operation of the cargo door of the truck. For example, the drag reduction apparatus 100 may be attached directly to the cargo door and may have a shape which allows for the door 12 to be operated (e.g., opened or closed) without removing the apparatus 100 or without having to first manipulate the apparatus 100 (e.g., move the apparatus aside or out of the way) in order to access and/or open the cargo door 12. For example, as previously described, the apparatus 100 may be attached to the door 12 using a double-hinge mechanism so as to prevent interference of the panels with operation of the cam lock bar 16 and/or prevent the panels from becoming pinched and/or damaged by the door hinge bite. Each base panel 116 may extend between the edge of the door 12 (e.g., proximate the door hinges at the driver-side and curb-side edges) and about the midpoint or centerline of the rear end of the vehicle trailer 10, where the two doors meet. As will be understood, the apparatus 100 may include two separate portions, left or driver-side portion and right or curb-side portion, and each portion may be secured to each of the door panels 12A-B of a split-type cargo door. In this manner, each of the two portions of the apparatus 100 may remain attached to each door panel 12A-B while the door is opened and closed (see e.g., FIG. 3).

The left and right portions of the apparatus 100 may adjoin and/or overlap at a seam 118 corresponding to the seam or interface of the two cargo doors 12A-B. The two portions may be configured to engage at the seam 118, e.g., to offer a nominal resistance to separation of the two portions during use. As described, the top panel section includes a left 102A and right 102B top panel sections. Aerodynamic advantage (e.g. drag reduction) may be diminished if only one of the left and right panels deploys. Thus, it may be advantageous for the left 102A and right 102B top panel sections to remain attached and/or deploy simultaneously. Similar advantages may be achieved by facilitating simultaneous deployment of the bottom left 112A and bottom right 112B panel sections. A mechanism may be provided at the seam 118, e.g., along any portions of the edges which overlap, which may resist separation of the panels along the seam. For example, magnetic or mechanical engagement mechanisms may be used. Magnetic tape or a plurality of magnetic strips may be provided along at least a portion of the seam for engagement between the two portions. Other magnet shapes may also be used. An example of a magnet placed on the seam 118 of the top panels 102A-B is shown in FIG. 4. In this example, the magnet 420 is attached to the edge of the right top panel 102B. The magnet 420 extends beyond the edge of the right top panel 102B to engage with the left top panel 102A. In other examples, mechanical attachment (e.g., Velcro) or adhesives (e.g., removable, reusable, pressure-sensitive adhesives) may additionally or instead be used. Other suitable attachment techniques may also be used.

An overlap at the seam 118 may facilitate an engagement between the two portions of the apparatus 100. Furthermore, in some embodiments, additional mechanisms for maintaining a connection between the two portions of the apparatus may be provided. In some examples, the panels may be configured such that they over-lap with curb-side panels over the driver-side panels. In some embodiments, this can be achieved by sizing the curb-side panels (B) wider than the driver-side panels (A) along the horizontal or lateral dimension. In other examples, and for ease of manufacture, each of the two halves may be generally the same size/dimensions, and separate strips of material may be attached along overlapping edges at the curb-side or driver-side portion as may be desired. A wider curb-side portion may be advantageous in many cases, e.g., as standard truck doors typically use an open/close arrangement in which the curbside door 12B closes over the driver side door 12A. Thus, in a standard configuration, a curb-side door 12B may typically first be disengaged first prior to opening the driver side door 12A. A corresponding overlap of the panels may be used.

One or more double-hinge mechanism according to the present examples may be used at the back (or unexposed) surface of the base panels 116A-B to attach the apparatus 100 to the cargo door 12A-B of the truck. The double-hinge mechanisms may be connected between the door panel 12 and a facing surface of the base panel 116. FIGS. 5A-B and FIGS. 6A-C illustrate examples of double-hinge mechanisms described herein. A double-hinge mechanism may be configured to allow the base panels 116A-B of the apparatus to move laterally relative to the door panels 12A-B, for example up/down or side-to-side, depending on the orientation of the double-hinge mechanism. For example, one or more double-hinge mechanisms may be disposed along the horizontal direction for translating the panels side to side, e.g., as described above for avoiding the bite of the door. The double-hinge mechanisms may be advantageously configured to allow the apparatus to temporarily move away or be provided in a spaced apart position from the door when the cam lock is operated. As may be appreciated, during locking and unlocking of the door, the cam lock bar 16 of the door 12 may displace outward from the door. This motion of the cam lock bar 16 would be obstructed by any structure that is rigidly mounted across the bar. Advantageously, the base panels 116A-B of the apparatus 100, which cover the cam lock bar 16, may be mounted in a movable manner using the double-hinge mechanism which may allow the panels to displace outward similar to the cam lock bar 16 and may further allow the panels to subsequently return to their neutral position closer to the door panels. In other examples, as may be needed or desired, the double-hinge mechanisms may be arranged vertically for translating the panels up and down, e.g., in examples in which the panels are sized smaller than the doors and/or up/down movement may instead be desired.

Figure 5A:
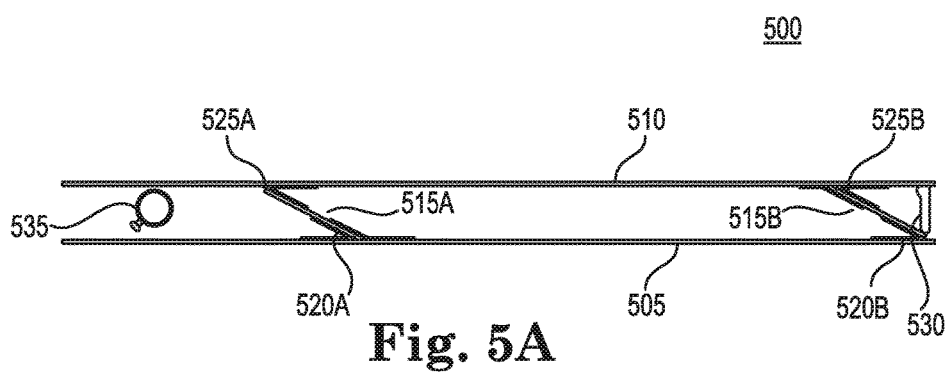
FIGS. 5A-B show an illustration of a double-hinge attachment method according to examples herein.
Figure 5B:
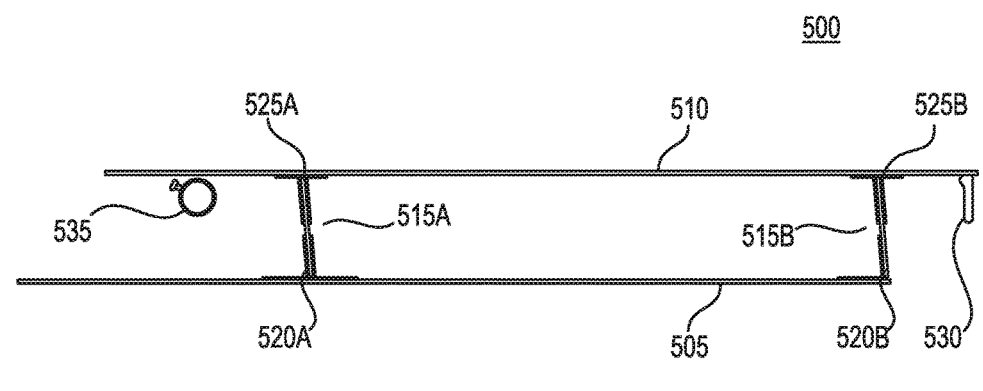

In the illustrations in FIGS. 5A-B, a first horizontal member 505 may represent the door panel and a second generally parallel horizontal member 510 may represent the base panel of the apparatus 100. The two horizontal members 505, 510 may be attached using a double-hinge mechanism 500 which may be represented by the two connecting members 515A-B that extend between the first 505 and second 510 horizontal members. The double-hinge mechanism 500 may include two pivotal connections 520A-B, 525A-B, each to one of the two horizontal members 505, 510, with one of the pivotal connections 520A-B, 525A-B pivoting in one direction and the other pivoting in the opposite direction. The double-hinge mechanism 515 may be configured to rotate or pivot up to 180 degrees at each of the two pivotal connections. This may enable the horizontal member 510 representing the apparatus portion to move away from and sideways relative to the door panel (e.g., from a first position as shown in FIG. 5A to a second position in FIG. 5B). As will be appreciated, during the position shown in FIG. 5B, the horizontal members 505, 510 may be sufficiently spaced apart to allow for movement of another structure which may be disposed between the two vertical panels. A bar 535 coupled to the first or second horizontal member 505, 510, may be used to operate the double-hinge mechanism. In some embodiments, when rotated, the bar 535 may cause the horizontal members to move from the position shown in FIG. 5A to the position shown in FIG. 5B. The bar 535 may be coupled by a strap, clamp, or other suitable attachment mechanism. In one embodiment, the bar 535 may be cam bar 16. Cam bar 16 may be rotated by a user operating the handle 14. A stop 530 may be provided to the double-hinge mechanism 500 to limit the movement of the double-hinge mechanism 500, e.g., to prevent either fully expanding or fully collapsing the double-hinge joint, as may be desired. Each pivotal connection 520A-B, 525A-B may be implemented using any suitable pivotal joint, for example a conventional hinge or a spring-loaded hinge which may enable an over-center action to urge the movement of the hinge in a predetermined direction. The two pivotal joints may be connected using a connecting member which may be made from a rigid material, such as metal, composite, or other suitable materials.

Figure 6A:
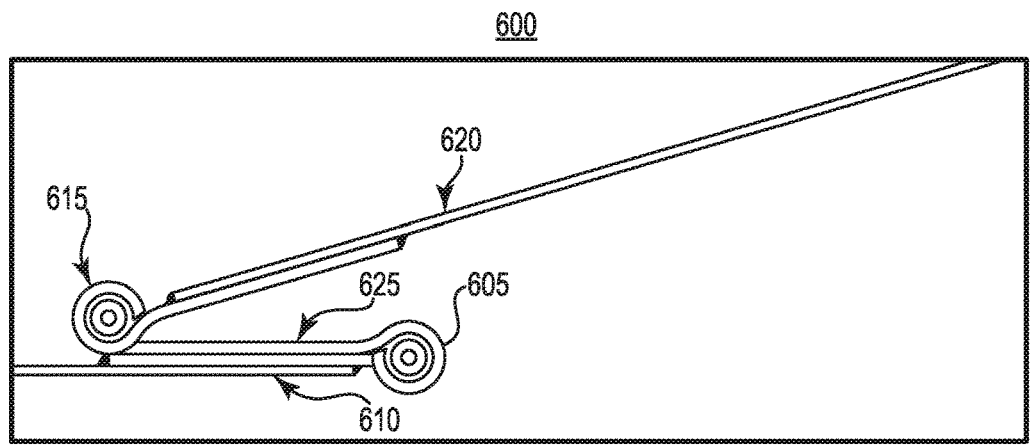
FIGS. 6A-C show an example of a double-hinge mechanism according to examples of the present disclosure.
Figure 6B:
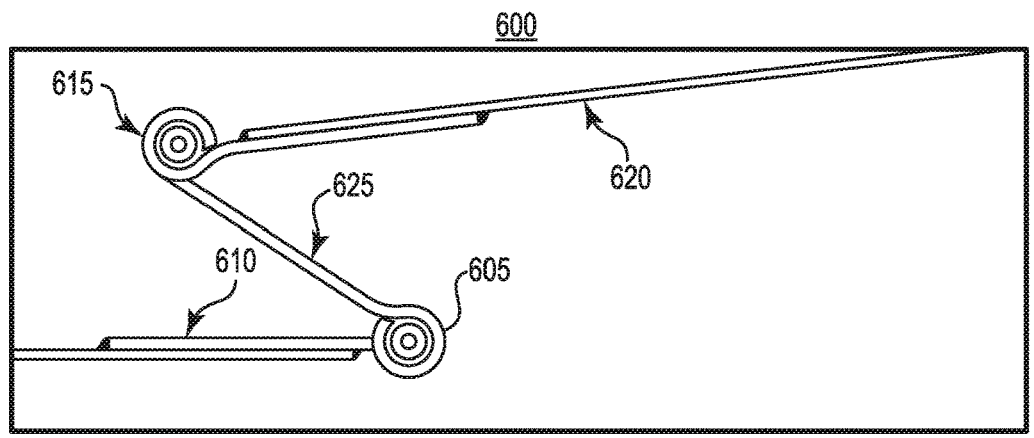
Figure 6C:
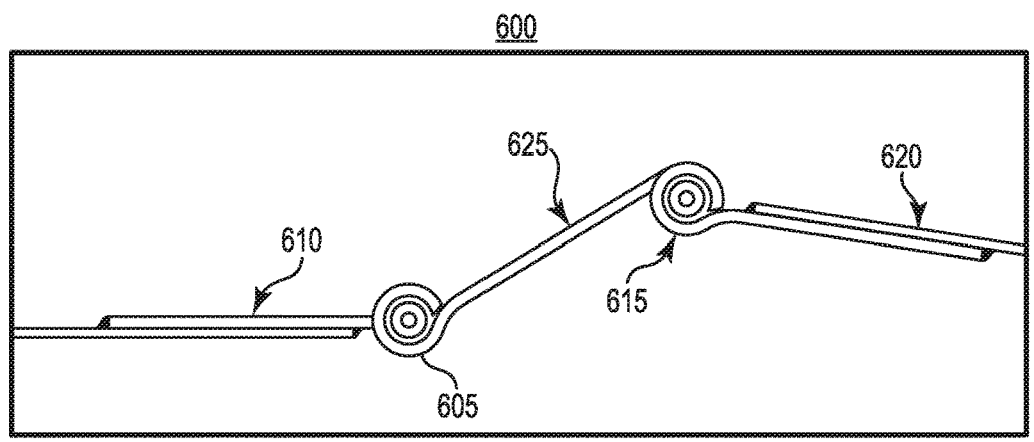

Referring to FIGS. 6A-6C, an example of a double-hinge joint 600 is depicted, which includes a first pivotal joint 605 connected to a first panel 610 (e.g., bottom plate) and a second pivotal joint 615 connected to a second panel 620 (e.g., top plate). The first and second pivotal joints 605, 615 are connected to each other using a connecting member 625. In some embodiments, the connecting member may be a metal plate. The first and second pivotal joints 605, 615 may be dissimilar, for example the first pivotal joint 605 may be an over-center joint (e.g., a spring loaded hinge joint), while the second pivotal 615 joint may freely rotate up to about 180 degrees. Using an over-center joint for one or more of the pivotal joints of the double-hinge member 600 may be advantageous as it may help retain the double-hinge member 600 in a first, e.g., neutral or collapsed position, as shown in FIG. 6A, or a second, e.g., expanded position, as shown in FIG. 6C, resisting a transition between the two positions, as shown in FIG. 6B. This may be useful for reducing or minimizing the risk that the panels will unexpectedly push away from the door, e.g., during use/deployment of the apparatus.

Apparatuses according to the present disclosure may be configured to be self-deploying, in that the panels may automatically unfold when a speed of the land vehicle reaches or exceeds a threshold speed high enough to generate a low pressure region around the vehicle (e.g., in the wake of the vehicle). The pressure around the vehicle may decrease as the speed of the vehicle increases resulting in high/low pressure regions, with the high pressure region located immediately behind the vehicle and the low pressure regions located around and/or in the wake of the vehicle. Thus, as the vehicle speed increases, a suction or outward/lifting force may be produced around and/or in the vehicle's wake, which may cause the panels of the apparatus to automatically deploy or unfold to form a cavity (see FIG. 1). As the speed of vehicle increases, the outermost of the peripheral panels may be pulled outward due to the low pressure region around the vehicle and as these panel unfold, the remaining panels (e.g., panels sandwiched between the outermost and base panels) may be pulled outward in part by the pressure differential and further assisted by the foldable attachment of the panels (e.g., by virtue of the transition panels connecting the main panels). The panels may remain in their unfolded or partially unfolded configuration as long as a low pressure region remains at the back of the vehicle. The panels may return to the folded configuration when the speed of the vehicle is below the threshold speed and the low pressure region diminishes. One or more of the panels may return to their folded position due, in part, to gravity. For example, when the speed of the truck is insufficient to maintain the cavity in its expanded shape, gravity may act on the top panel pulling it down and thereby causing the side panels to fold inwards. In some examples, the panels may be manually expanded prior to departure or folded down after reaching its destination by the vehicle operator, e.g., when the operator may wish to access the cargo compartment by opening the rear door on which the drag reducing apparatus is mounted. In some examples, the sizes, weights, composition and folding configuration of the panels may be further tailored to facilitate lower resistance in opening and folding of the drag reducing apparatus.

In some examples, drag reduction apparatuses according to the present disclosure may further be used as a gap-fill when multiple land vehicles (e.g. trailers) are arranged to travel in a coordinated manner (e.g. a road train configuration). In examples, two or more trailers may be pulled simultaneously using the same tractor unit, in which case, drag reduction apparatuses as described may be mounted at the rear end of each trailer. That is, one or more drag reduction devices are provided at intermediate locations along the length of the road train. In addition to providing drag reducing as a gap-fill apparatus, this arrangement may offer the added advantage of obviating the need for moving the drag reduction apparatus from one trailer to the next, particularly when the trailers are used interchangeably in a double- or triple-trailer configuration in which the trailers may be switched fore and aft.

Figure 2:
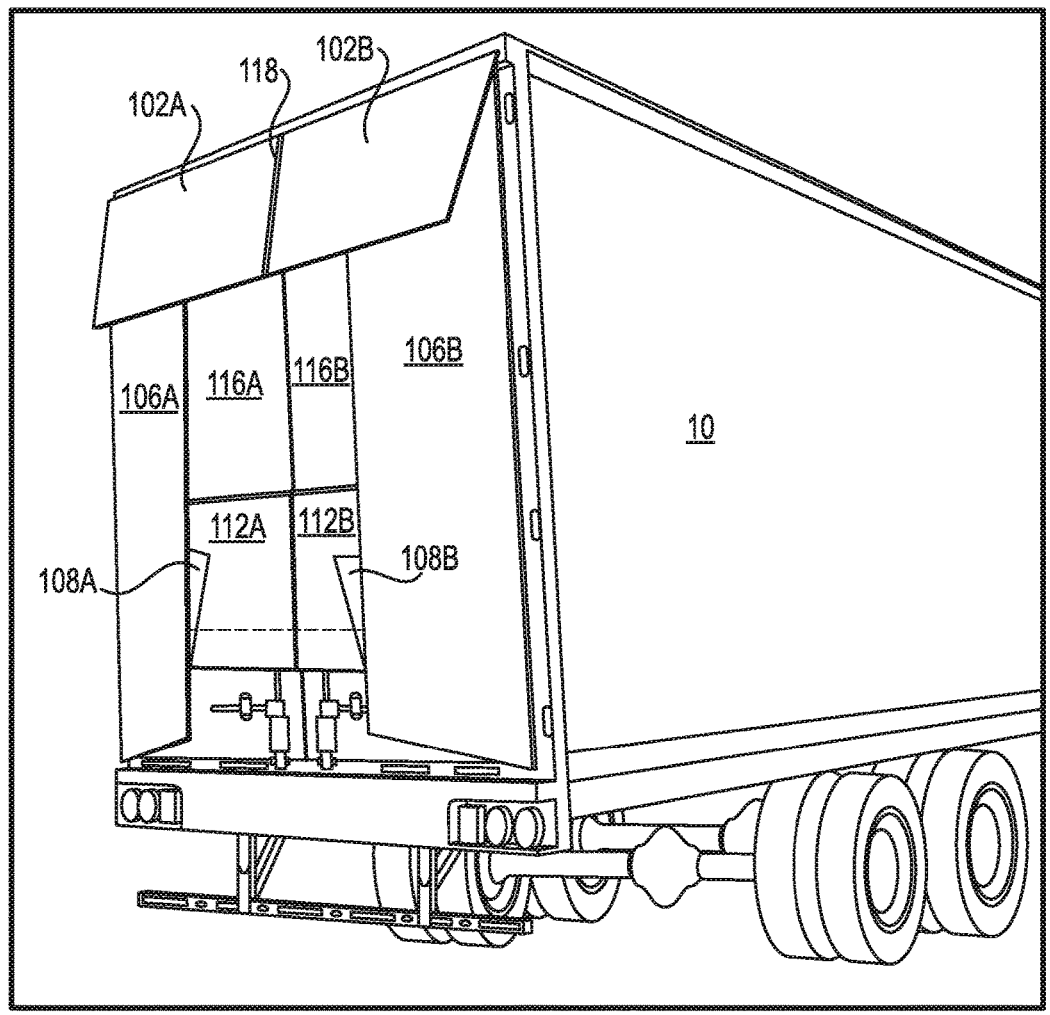
FIG. 2 shows an example according to the present disclosure, including an apparatus attached to a door of a truck, the apparatus shown during a folded or undeployed configuration.

While an exemplary folding configuration is depicted in the exemplary apparatus in FIGS. 2-3, other folding patterns, for example, in which the side panels overlap the top and/or bottom panels may be used. In some examples, and depending on the desired configuration, different shapes and fold lines may be used to effectuate different expanded configurations, for example configurations resulting in a more conical structure or various non-symmetric structures.

In some examples, when the operator desires to access the cargo compartment of the vehicle, the operator may operate the cam lock bar of the cargo door (see FIG. 3) and may open and close each door with the panels remaining attached thereto. The left and right portions of the apparatus are attached such that they move with the door panel. In other words, and contrary to known devices for drag reduction, the operator does not need to independently move the apparatus out of the way before opening the door using examples of drag reduction devices described herein but instead, the apparatus may move with the door and remain generally flat against the door during opening and closing of the door. If desired, additional straps, bungees, or other attachment mechanisms may be provided for securing the panels in the folded position.

While various aspects and examples have been disclosed herein, other aspects and examples will be apparent to those skilled in the art. The various aspects and examples disclosed herein are for purposes of illustration and are not intended to be limiting. Thus, the present disclosure is not intended to be limited to the embodiments shown herein but is to be accorded the widest scope possible consistent with the principles and novel features as defined by the following claims.

What is claimed is:

1. An apparatus, comprising:
   a plurality of panels including a pair of top panels, a pair of bottom panels, first and second side panels, and a plurality of transition panels connecting the top, bottom, and side panels, wherein the plurality of panels are foldably coupled to allow the plurality of panels to be provided in a folded configuration in which at least some of the plurality of panels are against each other and in a deployed configuration in which the plurality of panels define a cavity therebetween, wherein the pair of top panels are configured to transition between the folded configuration and the deployed configuration together and the pair of bottom panels are configured to transition between the folded configuration and the deployed configuration together; and
   a pair of base panels, wherein the pair of top panels and the first and second side panels are pivotally coupled to the base panels; and
   a plurality of hinge mechanisms attached to the base panels for coupling the base panels to first and second doors of a land vehicle, wherein each of the hinge mechanisms of the plurality of hinge mechanisms comprises a double-hinge mechanism which includes two pivotal connections configured to pivot in opposite directions.

2. The apparatus of claim 1, further comprising a retention mechanism configured to limit movement of one or more of the panels.

3. The apparatus of claim 2, wherein the retention mechanism comprises one or more cords, over-the-center brace members, or combinations thereof.

4. The apparatus of claim 1, wherein the pair of top panels and the first and second side panels are foldably coupled to the pair of base panels around a perimeter of the cavity, and wherein each of the bottom panels is foldably coupled to a respective one of the pair of base panels at an intermediate vertical location of the respective base panel.

5. The apparatus of claim 1, wherein the pivotal connections of the double-hinge mechanism are configured to pivot up to 180 degrees.

6. The apparatus of claim 1, wherein one of the top panels is longer than and overlaps the other top panel, and one of the bottom panels is longer than and overlaps the other bottom panel.

7. The apparatus of claim 1, wherein the top panels are magnetically coupled to one another and the bottom panels are magnetically coupled to one another.

8. The apparatus of claim 1, wherein the plurality of panels are configured to automatically transition to the deployed configuration when the land vehicle moves at a threshold velocity.

9. The apparatus of claim 1, wherein the plurality of panels are configured to automatically transition to the folded configuration when the land vehicle moves below a threshold velocity.

10. The apparatus of claim 1, wherein the plurality of panels comprise a rigid material, wherein the rigid material is configured to prevent the plurality of panels from sagging in the deployed configuration.

11. The apparatus of claim 1, wherein the panels are folded according a folding configuration in which the top panels are folded on top of the side panels in the folded configuration.

12. The apparatus of claim 1, wherein the hinge mechanisms facilitate lateral movement of the base panels during opening and closing of a door of the land vehicle.

13. The apparatus of claim 1, wherein the hinge mechanisms are biased so that the hinge mechanisms automatically return to a neutral position when the doors are pivoted back to about 90 degrees.

14. An apparatus, comprising:
    a plurality of panels including a pair of top panels, a pair of bottom panels, first and second side panels, and a plurality of transition panels connecting the top, bottom, and side panels, wherein the plurality of panels are foldably coupled to allow the plurality of panels to be provided in a folded configuration in which at least some of the plurality of panels are against each other and in a deployed configuration in which the plurality of panels define a cavity therebetween, wherein the pair of top panels are configured to transition between the folded configuration and the deployed configuration together and the pair of bottom panels are configured to transition between the folded configuration and the deployed configuration together, and wherein the top panels are magnetically coupled to one another and the bottom panels are magnetically coupled to one another; and
    a pair of base panels, wherein the pair of top panels and the first and second side panels are pivotally coupled to the base panels; and
    a plurality of hinge mechanisms attached to the base panels for coupling the base panels to first and second doors of a land vehicle.

15. The apparatus of claim 14, further comprising a retention mechanism configured to limit movement of one or more of the panels.

16. The apparatus of claim 15, wherein the retention mechanism comprises one or more cords, over-the-center brace members, or combinations thereof.

17. The apparatus of claim 14, wherein the pair of top panels and the first and second side panels are foldably coupled to the pair of base panels around a perimeter of the cavity, and wherein each of the bottom panels is foldably coupled to a respective one of the pair of base panels at an intermediate vertical location of the respective base panel.

18. The apparatus of claim 16, wherein each hinge mechanism of the plurality of hinge mechanisms comprises a double-hinge mechanism which includes two pivotal connections configured to pivot in opposite directions.

19. The apparatus of claim 18, wherein the pivotal connections of the double-hinge mechanism are configured to pivot up to 180 degrees.

20. The apparatus of claim 14, wherein one of the top panels is longer than and overlaps the other top panel, and one of the bottom panels is longer than and overlaps the other bottom panel.

21. The apparatus of claim 14, wherein the plurality of panels are configured to automatically transition to the deployed configuration when the land vehicle moves at a threshold velocity.

22. The apparatus of claim 14, wherein the plurality of panels are configured to automatically transition to the folded configuration when the land vehicle moves below a threshold velocity.

23. The apparatus of claim 14, wherein the plurality of panels comprise a rigid material, wherein the rigid material is configured to prevent the plurality of panels from sagging in the deployed configuration.

24. The apparatus of claim 14, wherein the panels are folded according a folding configuration in which the top panels are folded on top of the side panels in the folded configuration.

25. The apparatus of claim 14, wherein the hinge mechanisms facilitate lateral movement of the base panels during opening and closing of a door of the land vehicle.

26. The apparatus of claim 14, wherein the hinge mechanisms are biased so that the hinge mechanisms automatically return to a neutral position when the doors are pivoted back to about 90 degrees.

27. An apparatus, comprising:
a plurality of peripheral panels including a plurality of top panels, a plurality of bottom panels, and first and second side panels, wherein the plurality of peripheral panels are pivotally coupled such that they can be provided in a folded configuration in which at least some of the plurality of peripheral panels are against each other and in a deployed configuration in which the plurality of peripheral panels define a cavity therebetween, and
wherein the plurality of bottom panels include at least one bottom panel and a pair of bottom transition panels coupled to respective ones of the first and second side panels at a location spaced vertically upward from a lower end of the respective side panel, wherein the at least one bottom panel is configured to pivot downward when the apparatus transitions from the deployed configuration to the folded configuration; and
at least one attachment mechanism disposed along an edge of at least one of the top, bottom, and side panels which may be configured to foldably couple the edge of the at least one of the top, bottom, and side panels to a surface of a land vehicle.

28. The apparatus of claim 27, wherein the plurality of top panels includes first and second top panels and first and second top transition panels, and the plurality of bottom panels includes first and second bottom panels and first and second bottom transition panels, and wherein the first and second top panels are configured to transition from the folded configuration to the deployed configuration together and the first and second bottom panels are configured to transition from the folded configuration to the deployed configuration together.

29. The apparatus of claim 27, further comprising one or more base panels, wherein the peripheral panels are pivotally coupled to the base panels, and wherein the one or more base panels are configured to be attached to respective one or more surfaces of a land vehicle.

30. The apparatus of claim 29, wherein the at least one attachment mechanism comprises a plurality of hinge mechanisms attached to the base panels for coupling the base panels to the respective one or more surfaces of the land vehicle.

31. The apparatus of claim 27, further comprising a retention mechanism configured to limit movement of one or more of the panels.

32. The apparatus of claim 28, wherein each hinge mechanism of the plurality of hinge mechanisms comprises a double-hinge mechanism which includes two pivotal connections configured to pivot in opposite directions.

33. The apparatus of claim 32, wherein the pivotal connections of the double-hinge mechanism are configured to pivot up to 180 degrees.

34. The apparatus of claim 29, wherein one of the top panels is longer than and overlaps the other top panel, and one of the bottom panels is longer than and overlaps the other bottom panel.

35. The apparatus of claim 29, wherein the top panels are magnetically coupled to one another and the bottom panels are magnetically coupled to one another.

36. The apparatus of claim 27, wherein the plurality of peripheral panels are configured to automatically transition to the deployed configuration when the land vehicle moves at a threshold velocity.

37. The apparatus of claim 27, wherein the plurality of peripheral panels are configured to automatically transition to the folded configuration when the land vehicle moves below a threshold velocity.

38. The apparatus of claim 27, wherein the plurality of peripheral panels comprise a rigid material, wherein the rigid material is configured to prevent the plurality of panels from sagging in the deployed configuration.

39. The apparatus of claim 31, wherein the retention mechanism comprises one or more cords, over-the-center brace members, or combinations thereof.

40. The apparatus of claim 27, wherein the peripheral panels are folded according a folding configuration in which the top panels are folded on top of the side panels in the folded configuration.

41. The apparatus of claim 28, wherein the hinge mechanisms are configured to facilitate lateral movement of the base panels during opening and closing of a door of the land vehicle.

42. The apparatus of claim 41, wherein the hinge mechanisms are biased so that the hinge mechanisms automatically return to a neutral position when the door is pivoted back to about 90 degrees.

43. An apparatus, comprising:
a plurality of peripheral panels including a plurality of top panels, a plurality of bottom panels, and first and second side panels, wherein the plurality of peripheral panels are pivotally coupled such that they can be provided in a folded configuration in which at least some of the plurality of peripheral panels are against each other and in a deployed configuration in which the plurality of peripheral panels define a cavity therebetween, and
wherein the plurality of bottom panels include at least one bottom panel and a pair of bottom transition panels coupled to respective ones of the first and second side panels at a location spaced vertically upward from a lower end of the respective side panel, wherein the peripheral panels are folded according a folding configuration in which the top panels are folded on top of the side panels in the folded configuration; and
at least one attachment mechanism disposed along an edge of at least one of the top, bottom, and side panels which may be configured to foldably couple the edge of the at least one of the top, bottom, and side panels to a surface of a land vehicle.

44. The apparatus of claim 43, wherein the plurality of peripheral panels are configured to automatically transition to the deployed configuration when the land vehicle moves at a threshold velocity.

45. The apparatus of claim 43, wherein the plurality of peripheral panels are configured to automatically transition to the folded configuration when the land vehicle moves below a threshold velocity.

46. The apparatus of claim 43, wherein the plurality of top panels includes first and second top panels and first and second top transition panels, and the plurality of bottom panels includes first and second bottom panels and first and second bottom transition panels, and wherein the first and second top panels are configured to transition from the folded configuration to the deployed configuration together and the first and second bottom panels are configured to transition from the folded configuration to the deployed configuration together.

47. The apparatus of claim 43, wherein the at least one bottom panel is configured to pivot downward when the apparatus transitions from the deployed configuration to the folded configuration.

* * * * *